US012783486B2

(12) United States Patent
You et al.

(10) Patent No.: US 12,783,486 B2
(45) Date of Patent: Nov. 3, 2026

(54) DATABASE SYSTEM AND COLUMN CHANGING METHOD FOR DATABASE

(71) Applicant: CLOUD INTELLIGENCE ASSETS HOLDING (SINGAPORE) PRIVATE LIMITED, Singapore (SG)

(72) Inventors: Lingjing You, Hangzhou (CN); Mo Chen, Hangzhou (CN); Gui Huang, Hangzhou (CN); Feifei Li, Hangzhou (CN); Jianghang Lou, Hangzhou (CN)

(73) Assignee: CLOUD INTELLIGENCE ASSETS HOLDING (SINGAPORE) PRIVATE LIMITED, Singapore (SG)

( * ) Notice: Subject to any disclaimer, the term of this patent is extended or adjusted under 35 U.S.C. 154(b) by 63 days.

(21) Appl. No.: 19/108,930

(22) PCT Filed: Sep. 25, 2023

(86) PCT No.: PCT/CN2023/121268
§ 371 (c)(1),
(2) Date: Mar. 5, 2025

(87) PCT Pub. No.: WO2024/067528
PCT Pub. Date: Apr. 4, 2024

(65) Prior Publication Data

US 2026/0072889 A1 Mar. 12, 2026

(30) Foreign Application Priority Data

Sep. 29, 2022 (CN) ......................... 202211198909.3

(51) Int. Cl.
*G06F 16/22* (2019.01)
*G06F 16/23* (2019.01)
*G06F 16/27* (2019.01)

(52) U.S. Cl.
CPC ........ *G06F 16/221* (2019.01); *G06F 16/2282* (2019.01); *G06F 16/23* (2019.01); *G06F 16/27* (2019.01)

(58) Field of Classification Search
CPC ..................................................... G06F 16/221
(Continued)

(56) References Cited

U.S. PATENT DOCUMENTS

2014/0279855 A1* 9/2014 Tan ......................... G06F 16/23
707/609
2014/0376368 A1* 12/2014 Xiao ....................... H04L 47/12
370/230

(Continued)

FOREIGN PATENT DOCUMENTS

CN 20160117965 A 10/2016
CN 106471489 A 3/2017

(Continued)

OTHER PUBLICATIONS

International Search Report and Written Opinion received in PCT/CN2023/121268, dated Dec. 26, 2023, in 14 pages (with translation).

(Continued)

*Primary Examiner* — Muluemebet Gurmu
(74) *Attorney, Agent, or Firm* — Procopio, Cory, Hargreaves & Savitch LLP

(57) ABSTRACT

A database system and a column changing method for a database are provided, where a column attribute of a first column is changed to a change target value. Second columns are added into a physical data table and a physical GSI table, and into respective structure definitions of a logical data table and a logical GSI table, and are hidden from a user. The second columns in the logical data and GSI tables are respectively associated with the second columns in the
(Continued)

physical data and GSI tables, and a value of the attribute of the second column in the logical table is the change target value. Configuration is performed in the respective structure definitions, to replace a first column with the second column in user access logic of the database. The first columns are deleted from the physical data and GSI tables, and from the respective structure definitions.

20 Claims, 8 Drawing Sheets

(58) Field of Classification Search
USPC .......................................................... 707/625
See application file for complete search history.

(56) References Cited

U.S. PATENT DOCUMENTS

| | | | | |
|---|---|---|---|---|
| 2014/0379506 | A1* | 12/2014 | Marshall | G06F 9/5005 705/26.1 |
| 2022/0121632 | A1 | 4/2022 | Sassin | |
| 2025/0173321 | A1* | 5/2025 | Zhou | G06F 16/2228 |

FOREIGN PATENT DOCUMENTS

| | | | |
|---|---|---|---|
| CN | 108369587 | A | 8/2018 |
| CN | 113778632 | A | 12/2021 |
| CN | 114398369 | A | 4/2022 |
| CN | 115687343 | A | 2/2023 |

OTHER PUBLICATIONS

Notice of Allowance received in CN202211198909.3, dated May 29, 2025, in 6 pages (with translation).

* cited by examiner

DATABASE SYSTEM AND COLUMN CHANGING METHOD FOR DATABASE

CROSS-REFERENCE TO RELATED APPLICATION

This application is a National Stage of International Application No. PCT/CN2023/121268, filed on Sep. 25, 2023, which claims priority to Chinese patent application No. 202211198909.3, filed with the China National Intellectual Property Administration on Sep. 29, 2022 and entitled “DATABASE SYSTEM AND COLUMN CHANGING METHOD FOR DATABASE”. These applications are hereby incorporated by reference in their entireties.

TECHNICAL FIELD

The present disclosure relates to databases and, in particular, to solutions for performing column changing in a database.

BACKGROUND

With continuous popularization and deepening of Internet applications, the amount of data that needs to be processed is also increasing, the performance requirements for databases are getting higher and higher, and distributed databases have received more and more attention.

A distributed database system implemented based on an idea of distributed database sharding (Sharding) is mainly formed by one or more data nodes (DNs, which may also be referred to as “storage nodes”) and one or more computing nodes (CNs).

A logical table (which may also be referred to as “logical database table”) is stored on the computing node, and the logical table may have multiple shards (shards). Data of each shard is stored in a sharded-database sharded-table on a respective corresponding data node, that is, a physical table (which may also be referred to as “physical database table”).

When performing a database operation, a user may send a logical SQL (Structured Query Language) instruction acting on a logical table to a computing node, and then the computing node may send a physical SQL instruction acting on a physical table to a data node.

In addition, a concept of Global Secondary Index (GSI) is also proposed. A GSI is an index other than a data table (which may also be referred to as “primary table” or “data primary table” in some cases), and may contain several columns and primary keys of the primary table, and adopt different sharding modes. The data of the data table and the data of the GSI are the same. The data table and the GSI may each have a logical table on a computing node and a physical table on a data node.

A table is formed by one or more columns. A column stores information about certain part of the table. Each column has its own column name and corresponding column type (data type). Each column stores a specific piece of information. For example, in a personnel information table, one column stores personnel serial numbers; another column stores personnel names; addresses, cities, states, and postal codes are also stored in respective columns; each row corresponds to a respective different person, recording his/her various pieces of information.

In some cases, a changing operation, i.e., a column changing operation, needs to be performed on an attribute of a column in a table. For example, a change may be made to a column name and/or a column type.

When a traditional method is used to perform an operation of modifying a column type on a distributed database, the types of columns in the respective physical tables of the data table and the GSI cannot be changed at the same time, which may cause columns and data of different types before and after the modification to be seen simultaneously on the primary table and the GSI at a certain time point, thereby resulting in an execution failure of a user’s write or read access request.

In some database solutions, a third-party tool or a self-contained tool is used to perform a column changing operation. Their common characteristics are that data needs to be copied to a new table, the execution time is long, and a trigger or Binlog of MySQL needs to be relied on additionally.

In some other traditional database solutions, for an operation of changing a column type, a database system (for example, MySQL) on a data node needs to handle it in the case of locking the table. However, if the SQL of the corresponding table is to be performed during locking, an error will be reported, that is, online column changing cannot be realized. This will affect normal execution of a service.

Therefore, there is still a need for an improved solution of database column changing.

SUMMARY

A technical problem to be solved in the present disclosure is to provide a solution of database column changing, which can conveniently implement column changing without resulting in a failure of user’s write or read access during the column changing.

According to a first aspect of the present disclosure, a column changing method for a database is provided, where the database has a data table and a global secondary index (GSI) for the data table, the data table having a logical data table on a computing node and a physical data table on a data node, and the GSI having a logical GSI table on the computing node and a physical GSI table on the data node; and the method includes: adding a second column into each of the physical data table and the physical GSI table, where a value of at least one attribute of the second column in each of the physical data table and the physical GSI table is a change target value of a corresponding to-be-changed attribute of a first column in the data table; adding a second column into a respective structure definition of each of the logical data table and the logical GSI table, and making the second column hidden from a user, where the second column in the logical data table and the second column in the logical GSI table are respectively associated with the second column in the physical data table and the second column in the physical GSI table, and a value of the at least one attribute of the second column in each of the logical data table and the logical GSI table is the change target value; performing configuration in the respective structure definition of each of the logical data table and the logical GSI table, to replace a first column with the second column in user access logic of the database; deleting the first column from each of the physical data table and the physical GSI table; and deleting the first column from the respective structure definition of each of the logical data table and the logical GSI table.

In an implementation, both a column name of the second column in each of the physical data table and the physical GSI table and a column name of the second column in each of the logical data table and the logical GSI table are a change target value of a column name of the first column.

Or, in an implementation, a column name of the second column in the physical data table and a column name of the second column in the physical GSI table may be different from a column name of the second column in the logical data table and a column name of the second column in the logical GSI table, and the column name of the second column in the logical data table and the column name of the second column in the logical GSI table are configured to be mapped to the column name of the second column in the physical data table and the column name of the second column in the physical GSI table.

In an implementation, the method may further include: each time after performing changing on the respective structure definition of each of the logical data table and the logical GSI table, synchronizing a changed structure definition of each of the logical data table and the logical GSI table to all computing nodes.

In an implementation, the operation of synchronizing the changed structure definition of each of the logical data table and the logical GSI table to all computing nodes is an atomic operation.

In an implementation, after performing the configuration in the respective structure definition of each of the logical data table and the logical GSI table, to replace the first column with the second column in the user access logic of the database, and synchronizing the changed structure definition of each of the logical data table and the logical GSI table to all computing nodes, the step of deleting the first column from each of the physical data table and the physical GSI table is performed.

In an implementation, the method may further include: after adding the second column and before deleting the first column, making the second column of the physical data table and the second column of the physical GSI table have same data content as the first column of the physical data table and the first column of the physical GSI table.

In an implementation, the step of making the second column of the physical data table and the second column of the physical GSI table have the same data content as the first column of the physical data table and the first column of the physical GSI table includes: in a case that the first column is displayed to the user and the second column is hidden from the user, performing configuration in the respective structure definition of each of the logical data table and the logical GSI table, to copy modification of the respective first column onto the respective second column in each of the physical data table and the physical GSI table; and/or copying existing data content in the respective first column of each of the physical data table and the physical GSI table onto the respective second column in each of the physical data table and the physical GSI table; and/or in a case that the first column is hidden from the user and the second column is displayed to the user, performing configuration in the respective structure definition of each of the logical data table and the logical GSI table, to stop copying the modification of the respective first column onto the respective second column in each of the physical data table and the physical GSI table, and to copy modification of the respective second column onto the respective first column in each of the physical data table and the physical GSI table.

In an implementation, before the step of deleting the first column from each of the physical data table and the physical GSI table, the method further includes: performing configuration in the respective structure definition of each of the logical data table and the logical GSI table, to stop copying the modification of the second column onto the respective first column of each of the physical data table and the physical GSI table.

In an implementation, the to-be-changed attribute of the first column includes a column name and a column type, or only includes a column name; and the step of performing the configuration in the respective structure definition of each of the logical data table and the logical GSI table, to replace the first column with the second column in the user access logic of the database, includes: performing the configuration in the respective structure definition of each of the logical data table and the logical GSI table, so that the first column is hidden from the user and the second column is displayed to the user.

In an implementation, the to-be-changed attribute of the first column includes a column type, and the step of performing the configuration in the respective structure definition of each of the logical data table and the logical GSI table, to replace the first column with the second column in the user access logic of the database, includes: exchanging a column name of the first column and a column name of the second column in each of the physical data table and the physical GSI table, or modifying column names of first columns and column names of second columns in the logical data table and the logical GSI table to be mapped respectively to column names of second columns and column names of first columns in the physical data table and the physical GSI table; and exchanging a column name of the first column and a column name of the second column in the respective structure definition of each of the logical data table and the logical GSI table.

In an implementation, the database is a distributed database.

In an implementation, for the database, an operation is performed on a column based on a column name.

According to a second aspect of the present disclosure, a database system is provided, including one or more computing nodes and one or more data nodes, where a column changing operation is performed by using the method according to the above first aspect.

According to a third aspect of the present disclosure, a computing device is provided, including: a processor; and a memory storing executable code, where when the executable code is executed by the processor, the processor is caused to perform the method according to the above first aspect.

According to a fourth aspect of the present disclosure, a computer program product is provided, including executable code, where when the executable code is executed by a processor of an electronic device, the processor is caused to perform the method according to the above first aspect.

According to a fifth aspect of the present disclosure, a non-transitory machine-readable storage medium having executable code stored thereon is provided, where when the executable code is executed by a processor of an electronic device, the processor is caused to perform the method according to the above first aspect.

Therefore, column changing for the database is conveniently implemented, and an execution failure of a user's write or read access request will not be caused during the column changing.

BRIEF DESCRIPTION OF DRAWINGS

The above and other objects, features and advantages of the present disclosure will become more apparent through a more detailed description of exemplary embodiments of the present disclosure with reference to the accompanying drawings, where the same reference signs generally represent the same parts in the exemplary embodiments of the present disclosure.

DESCRIPTION OF EMBODIMENTS

Figure 1:
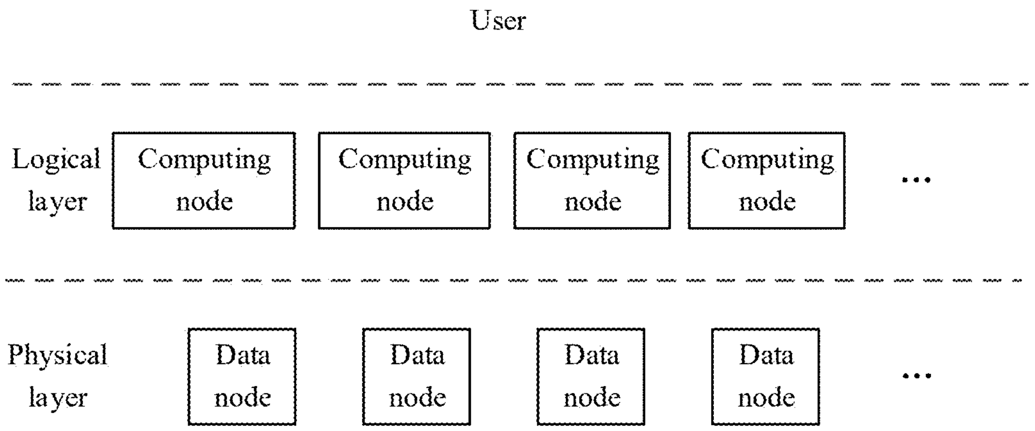
FIG. 1 is a schematic block diagram of a distributed database system.

Preferred embodiments of the present disclosure will be described in more detail below with reference to the accompanying drawings. Although preferred embodiments of the present disclosure are shown in the drawings, it should be understood that the present disclosure may be implemented in various forms and should not be limited by the embodiments set forth herein. Rather, these embodiments are provided in order to make the present disclosure more thorough and complete, and to be able to fully convey the scope of the present disclosure to those skilled in the art.

In a distributed database, when performing a column changing operation, corresponding physical DDL instructions need to be executed on all physical tables, and a structure definition of a logical table (which may also be referred to as "logical Schema") stored in a computing node needs to be modified to be consistent with a structure definition of a physical table (which may also be referred to as "physical Schema") after the execution of a physical DDL instruction.

DDL is a data definition language, such as column adding, column type changing, column length changing, constraint adding, etc.

However, there are some problems in this process.

In the process of performing physical column changing, due to the nature of distribution, it is generally impossible to make all physical DDL instructions complete at the same time. Therefore, it is not possible to select an exact time point to perform the changing on the logical Schema.

For example, in some cases, a user further modifies a column name while modifying a column type. In this way, there may be a time point when some physical tables have completed the physical DDL instruction and are using the new column name, while other physical tables have not completed the physical DDL instruction and are using the old column name. At this time, an error will be reported for a query instruction issued by the user, regardless of whether the new column name or the old column name is used.

Or, it is also possible that after physical column changing is performed on a data table, column changing has not been performed on a global secondary index (GSI), and column types of said columns in the data table and the GSI are inconsistent.

On the other hand, a database system may have multiple computing nodes. In this way, in the process of logical Schema changing, logical Schemas in different versions used before and after the changing may be seen in different computing nodes. At this point, it needs to ensure that all of the computing nodes, in which the logical Schemas in different versions used before and after the changing are seen, can work normally.

On the other hand, since column changing is not an online DDL operation on MySQL, a DML statement sent to a physical table will be blocked when the DDL instruction is being executed on the physical table, thus affecting normal execution of a user service.

Here, the "online DDL operation" refers to a DDL operation that allows user's DML statements to be executed concurrently during execution of the DDL instruction. DML is a data manipulation language, such as insert (INSERT), update (UPDATE), delete (DELETE) and other statements.

The present disclosure proposes a novel solution of database column changing, in which changing of column attributes can be conveniently implemented by adding a new column, switching access logic between the new column and an old column, and deleting the old column. For the user, changing of the data table and the GSI will not result in a failure of write or read access.

First, a distributed database system, to which solutions of column changing in the present disclosure may be applied, is briefly described with reference to FIG. 1 to FIG. 3.

FIG. 1 is a schematic block diagram of a distributed database system.

As shown in FIG. 1, a distributed database may include one or more computing nodes and one or more data nodes.

Figure 2:
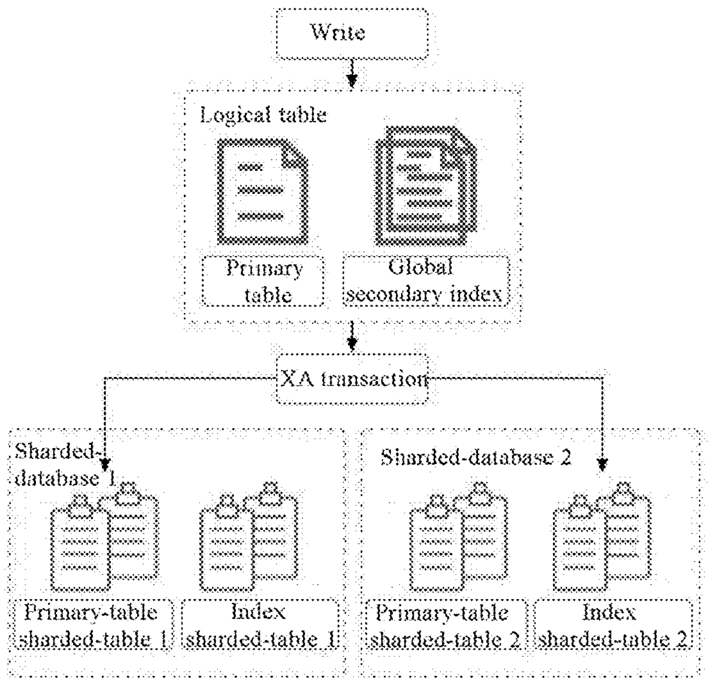
FIG. 2 is a schematic diagram of performing a write operation in a database with a global secondary index (GSI).
Figure 3:
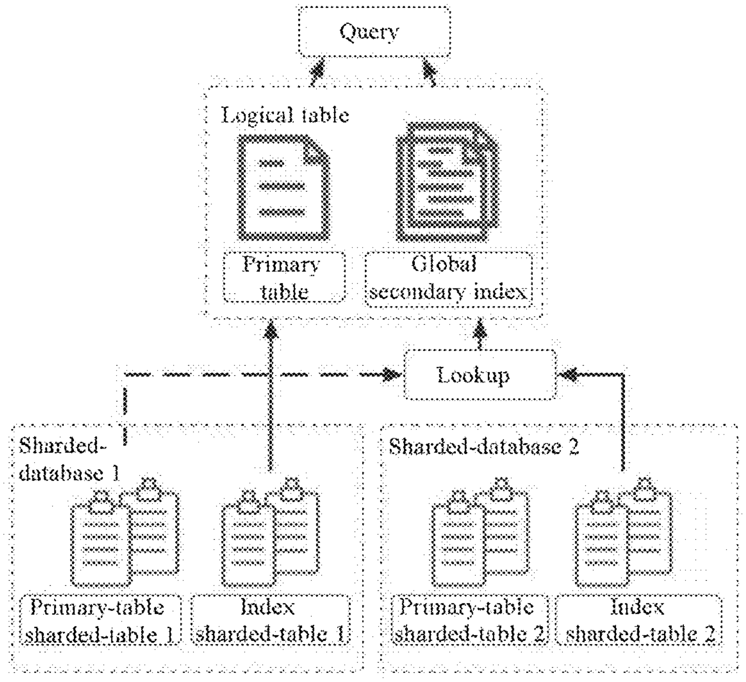
FIG. 3 is a schematic diagram of performing a query operation in a database with a global secondary index (GSI).

FIG. 2 and FIG. 3 are schematic diagrams of performing write and query operations in a distributed database with a GSI, respectively.

As shown in FIG. 2 and FIG. 3, the distributed database includes a logical table in a logical layer and physical tables (sharded-database 1, sharded-database 2 . . . ) in a physical layer. The logical table may be located on a computing node, and the physical table may be located on a data node. Different sharded-databases may be located on multiple different data nodes. The logical table may also be located on multiple computing nodes.

The distributed database has a data table (e.g., a primary table) and a GSI for providing a global secondary index for the data table, e.g., the primary table. The data table and the GSI further have physical tables (primary-table sharded-table 1, primary-table sharded-table 2; index sharded-table 1, index sharded-table 2; . . . ) on the data nodes and logical tables on the computing node, respectively.

For ease of description, in the present disclosure, the logical table of the data table is referred to as a "logical data table", the physical table of the data table is referred to as a "physical data table" (i.e., the primary-table sharded-tables in FIG. 2 and FIG. 3), the logical table of the GSI is referred to as a "logical GSI table", and the physical table of the GSI is referred to as a "physical GSI table" (i.e., the index sharded-tables in FIG. 2 and FIG. 3).

It should be understood that, the logical data table, the physical data table, the logical GSI table, and the physical GSI table that are for the same data table have the same columns, but representation forms or storage forms of the columns are different. For ease of description, in the present disclosure, the same columns in the logical data table, the physical data table, the logical GSI table, and the physical GSI table that are for the same data table are no longer named separately.

In the present disclosure, the expressions of "first" and "second" in "first column" and "second column" are only used to distinguish different columns, and do not indicate any other meanings such as sequence, or primary and secondary.

A user may send a logical SQL (Structured Query Language) instruction (such as a write instruction or a query instruction) acting on a logical table to a computing node. Then, the computing node may send a physical SQL instruction acting on a physical table to a data node.

Regarding the global secondary index (GSI), a further description is as follows.

In a distributed database, if a data row and a corresponding index row are stored on the same shard, this type of index is called a local index. Unlike the local index, if a data row and a corresponding index row are stored on different shards, this type of index is called a global secondary index, which is mainly used to quickly determine a data shard involved in a query. The two can be used together. After the query is issued to a single shard through the GSI, the local index on this shard can improve query performance within the shard.

The GSI supports increasing split dimensions on demand and provides a globally unique index. Each GSI corresponds to an index table, and XA multi-write is used to ensure strong data consistency between the primary table and the index table. Here, an "XA transaction" means a "distributed transaction".

If the dimension of the query is different from the split dimension of the logical table, a cross-shard query may be generated. The increase of cross-shard queries will result in performance issues such as a slow and lagging query and exhaustion of connection pools. Using the GSI can reduce cross-shard queries by increasing the split dimensions and eliminate a performance bottleneck.

A column changing method for a database according to the present disclosure is described below with reference to FIG. 4.

The column changing refers to changing an attribute of a column in the database to a change target value. The to-be-changed attribute may be, for example, a column name and/or a column type.

Figure 4:
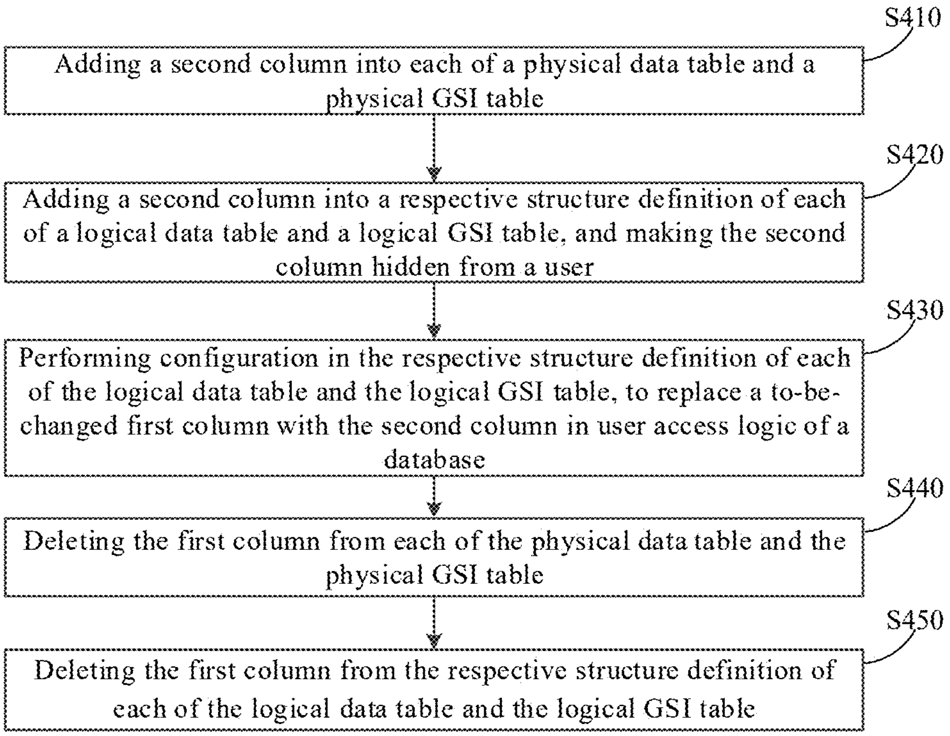
FIG. 4 is a schematic flowchart of a column changing method for a database according to the present disclosure.

FIG. 4 is a schematic flowchart of a column changing method for a database according to the present disclosure. The database here may be a distributed database.

It is assumed that changing is to be performed on an attribute of a first column in the database. It should be understood that a logical data table and a corresponding physical data table have associated first columns therein, a logical GSI table and a corresponding physical GSI table have associated first columns therein, and the first columns in the logical GSI table and the physical GSI table provide a global secondary index for the first columns in the logical data table and the physical data table.

The present disclosure creatively proposes to implement a new solution of online column changing for a database through online DDL operations such as column adding, column renaming, and column deleting on a database system such as MySQL.

As shown in FIG. 4, in step S410, a second column is added into each of a physical data table and a physical GSI table. A value of at least one attribute of the second column in each of the physical data table and the physical GSI table is a change target value of a corresponding to-be-changed attribute of a first column in the data table. The column changing operation is expected to change the value of the attribute of the first column to the change target value of such attribute.

Thus, the second column is added on a physical layer of a data node.

The attribute of the column may include, for example, a column name, a column type, etc.

In some cases, the column name of the second column added here may be different from a target value of the column name of the first column.

In some solutions, an association between a column of the logical table and a column of the physical table is achieved through the same column name between the logical table and the physical table, that is, columns in the logical table and the physical table having the same column name are associated and correspond to the same column.

In this case, if the attribute expected to be changed in the first column includes a column name, the column name of the second column may be set to the change target value of the column name of the first column. That is, if it is hoped to change the column name of the first column to "N", then the column name of the second column in the physical table is set to "N".

In some other solutions, an association between a column of the logical table and a column of the physical table is achieved through a mapping relationship of column names between the logical table and the physical table. In other words, the mapping relationship may be configured to record which column name in the physical table each column name in the logical table corresponds to respectively. The logical table is user oriented, and a user can find the expected column name by looking up the logical table. Based on the column name in the logical table, the corresponding column name in the physical table can be determined through the mapping relationship, so that a query is performed in the physical table based on the corresponding physical-table column name.

In this case, if the attribute expected to be changed in the first column includes a column name, the column name of the second column does not need to be set to the change target value of the column name of the first column, but may be set to any column name that satisfies a general column name condition (e.g., no conflict, no duplication). That is, if it is hoped to change the column name of the first column to "N", the column name of the second column in the physical table does not need to be set to "N", but may be set to, for example, "M". In this way, later on, the column name of the second column in the logical table may be set to "N", and the column name "N" in the logical table may be mapped to the column name "M" in the physical table.

In addition, column names of corresponding columns in the data table and the GSI are generally the same. A column name set of the GSI is a subset of a column name set of the data table.

In step S420, a second column is added into a respective structure definition (schema) of each of the logical data table and the logical GSI table, and the second column is made hidden from a user.

It should be understood that the second columns in the logical data table and the logical GSI table are respectively associated with the second columns in the physical data table and the physical GSI table, and a value of at least one attribute of the second column in each of the logical data table and the logical GSI table is the change target value of such attribute.

As described above, in the case that the association between the column of the logical table and the column of the physical table is achieved through the same column name between the logical table and the physical table, if it is needed to change the column name, the column names of the second columns in the physical data table and the physical GSI table set in the above step S410 are the same as the column names of the second columns in the logical data table and the logical GSI table set in the above step S420, which both are the change target value of the column name. Thus, the association between the newly added second columns in the logical table and the physical table can be achieved.

On the other hand, in the case that the association between the column of the logical table and the column of the physical table is achieved through the mapping relationship of the column names between the logical table and the physical table, the column name of the second column of the logical table is configured to have the change target value of the column name, and the column name of the second column of the physical table does not necessarily need to be the change target value of the column name. By configuring the column names of the second columns in the logical data table and the logical GSI table to be mapped to the column names of the second columns in the physical data table and the physical GSI table, the association between the two can be achieved.

Thus, the second column is added on a logical layer of a computing node.

At this time, the first column is not changed and is still displayed to the user.

In step S430, configuration is performed in the respective structure definition of each of the logical data table and the logical GSI table, to replace the to-be-changed first column with the second column in user access logic of the database.

Specifically, the configuration may be performed in the respective structure definition of each of the logical data table and the logical GSI table, so that the first column to be changed is hidden from the user, while the second column is displayed to the user, and the second columns in the logical data table and the logical GSI table are kept associated with the second columns in the physical data table and the physical GSI table, respectively.

Thus, an exchange between the second column and the first column in the user access logic is realized. For the user, a column having the original attribute value (the first column) is changed to a column having the change target value of the attribute (the second column). Although replacement for two columns is actually performed, what the user feels seems to be only attribute changing for one column.

Thereafter, the user accesses (writes or queries) the second column in the physical table through the second column in the logical table. The second column is displayed to the user, and the first column is no longer displayed to the user, but hidden from the user.

Hereinafter, the configuration operation of the step S430 will be described in further detail.

Here, the to-be-changed column attribute of the first column may include a column name and/or a column type. There may be different configuration schemes for different change attributes.

When the to-be-changed attribute of the first column includes the column name and the column type, or only includes the column name, the configuration may be performed in the respective structure definition of each of the logical data table and the logical GSI table, so that the first column is hidden from the user and the second column is displayed to the user.

In this way, the user will see that a column having the column name (and the column type) of the second column in the logical table replaces an original column having the column name (and the column type) of the first column, just as the column name (and the column type) of the original first column is changed to the column name (and the column type) of the second column.

As described above, the second column in the physical table may have the same column name as the second column in the logical table, or may have a different column name, where it is only necessary to keep the column name of the second column in the logical table mapped to the column name of the second column in the physical table.

On the other hand, when the column name does not need to be changed, but only the column type is expected to be changed, that is, when the to-be-changed attribute of the first column includes the column type, the changing of the user access logic may be implemented by firstly exchanging association relationships of column names of the first column and the second column in the physical table with column names of the first column and the second column in the logical table, and then exchanging the column names of the first column and the second column in the logical table. When adding the second column in the step S410, since the column attribute expected to be changed does not include the column name, the column name of the second column may be set to any new column name that satisfies a general column name condition (e.g., no conflict, no duplication).

For example, in the case that the association between the column of the logical table and the column of the physical table is achieved through the same column name between the logical table and the physical table, firstly the column name of the first column and the column name of the second column may be exchanged in the physical data table and the physical GSI table, and then association relationships of column names of the first column and the second column in the physical table with column names of the first column and the second column in the logical table may be exchanged.

On the other hand, in the case that the association between the column of the logical table and the column of the physical table is achieved through the mapping relationship of the column names between the logical table and the physical table, the column name of the first column and the column name of the second column may be exchanged in the physical data table and the physical GSI table; or the column names of the first columns and the column names of the second columns in the logical data table and the logical GSI table may be modified to be mapped respectively to the column names of the second columns and the column names of the first columns in the physical data table and the physical GSI table, thereby exchanging the association relationships of the column names of the first column and the second column in the physical table with the column names of the first column and the second column in the logical table. In other words, in this case, the column names of the first column and the second column in the physical table may not need to be modified, and only the mapping relationships of the first columns and the second columns in the logical table and the physical table need to be modified (exchanged).

At this time, the column-name-based association relationships of the first column and the second column in the physical table with the first column and the second column in the logical table have been exchanged, but the column names in the logical table have not been exchanged.

It should be understood that in the database, an operation may be performed on a column based on a column name. Although the respective first columns and the respective second columns in different tables can be distinguished through, for example, their distinct and unique column IDs respectively, when performing access control, or when sending a physical SQL instruction from a logical layer of a computing node to a physical layer of a data node, a column to be accessed can be determined through a column name. A column displayed to the user and/or a column hidden from the user may also be configured through a column name in the respective structure definition of each of the logical data table and the logical GSI table. In fact, for a write or query request issued by the user, the column to be accessed is also determined based on the column name.

In this way, the first columns (with original column names) in the logical data table and the logical GSI table will become associated with the second columns (with original column names or mapping relationships corresponding to the first columns of the logical tables after exchanging) in the physical data table and the physical GSI table, and the second columns (with new column names) in the logical data table and the logical GSI table will become associated with the first columns (with new column names or mapping relationships corresponding to the second columns of the logical tables after exchanging) in the physical data table and the physical GSI table.

At this time, the first columns with the original column names are still displayed to the user in the logical data table and the logical GSI table, and the second columns with the new column names are hidden from the user. After exchanging of column names or exchanging of column name mapping relationships, the second columns with the original column names or with the mapping relationships corresponding to the first columns of the logical tables after the exchanging in the physical data table and the physical GSI table are respectively associated with the first columns in the logical data table and the logical GSI table, and the first columns with the new column names or with the mapping relationships corresponding to the second columns of the logical tables after the exchanging in the physical data table and the physical GSI table are respectively associated with the second columns in the logical data table and the logical GSI table. When accessing the first column of an original column type in the logical layer, the user actually accesses the second column of a new column type (a change target value of an attribute) in the physical layer.

Then, the column names of the first column and the second column are exchanged in the respective structure definition of each of the logical data table and the logical GSI table.

At this point, the column names in both the physical table and the logical table are exchanged. In each of the logical data table and the logical GSI table, the second column with the original column name is displayed to the user, and the first column with the new column name is hidden from the user. The second columns in the logical data table and the logical GSI table and the second columns in the physical data table and the physical GSI table have the same column names (the original column names) or have the column-name-based mapping relationships, and are thus associated. The first columns in the logical data table and the logical GSI table and the first columns in the physical data table and the physical GSI table have the same column names (the new column names) or have the column-name-based mapping relationships, and are thus associated.

Thus, (in the logical table) the user will see that the column with the original column name and the new column type (the second column) replaces the column with the original column name and the original column type (the first column), just as the original column type of the original first column is changed to the column type of the second column (the new column type).

Then, in step S440, the first column may be deleted from each of the physical data table and the physical GSI table.

In step S450, the first column is deleted from the respective structure definition of each of the logical data table and the logical GSI table.

Since the user will no longer access the first column, the step S440 and the step S450 may be reversed in terms of the order, or performed simultaneously.

As described above, the database system may have multiple computing nodes, and each computing node may have a logical data table and a logical GSI table.

Each time after performing changing on the respective structure definition of each of the logical data table and the logical GSI table, a changed structure definition of each of the logical data table and the logical GSI table may be synchronized to all computing nodes.

Synchronizing a structure definition of a logical table (logical Schema) refers to sending an updated structure definition from a computing node executing a DDL instruction to all computing nodes. After this operation is completed, the updated structure definition (logical Schema) will be seen in all of the computing nodes.

It should be noted that the synchronization operation at each time is atomic, i.e., an atomic operation.

The atomic operation refers to one or a series of operations that cannot be interrupted. The synchronization operation may include a series of operations. Since the synchronization operation is atomic, after the synchronization operation is completed, either the state after the update or the state before the update is seen in all of the computing nodes. There will be no situation that some nodes succeed and some nodes fail, nor will there be a situation that partial success in this series of operations is seen at a certain time in a certain node.

In this way, modifications to both the logical data table and the logical GSI table either succeed at the same time or fail at the same time, without other intermediate results.

In this way, after the configuration operation in the step S430 is completed and the changed structure definition of the logical data table and the changed structure definition of the logical GSI table are synchronized to all of the computing nodes, the column deletion operations in the above steps S440 and S450 may then be performed.

It has been described above with reference to FIG. 4 that the attribute changing for the first column is implemented from a user's perspective by adding the second column having the change target value of the attribute and replacing the first column with the second column.

In some cases, for example, when a column changing operation is performed online, the first column may already have some data content before the changing, and during the changing, the user may also perform a modification access operation on the first column or the second column. Therefore, after adding the second column into the structure definition of the logical table in the step S420, and before deleting the first column from the physical table in the step S440, the second columns of the physical data table and the physical GSI table may be further made to have the same data content as the first columns of the physical data table and the physical GSI table.

In this way, maintenance and continuation of the data content in the columns can be further ensured while the column changing is implemented smoothly.

Figure 5:
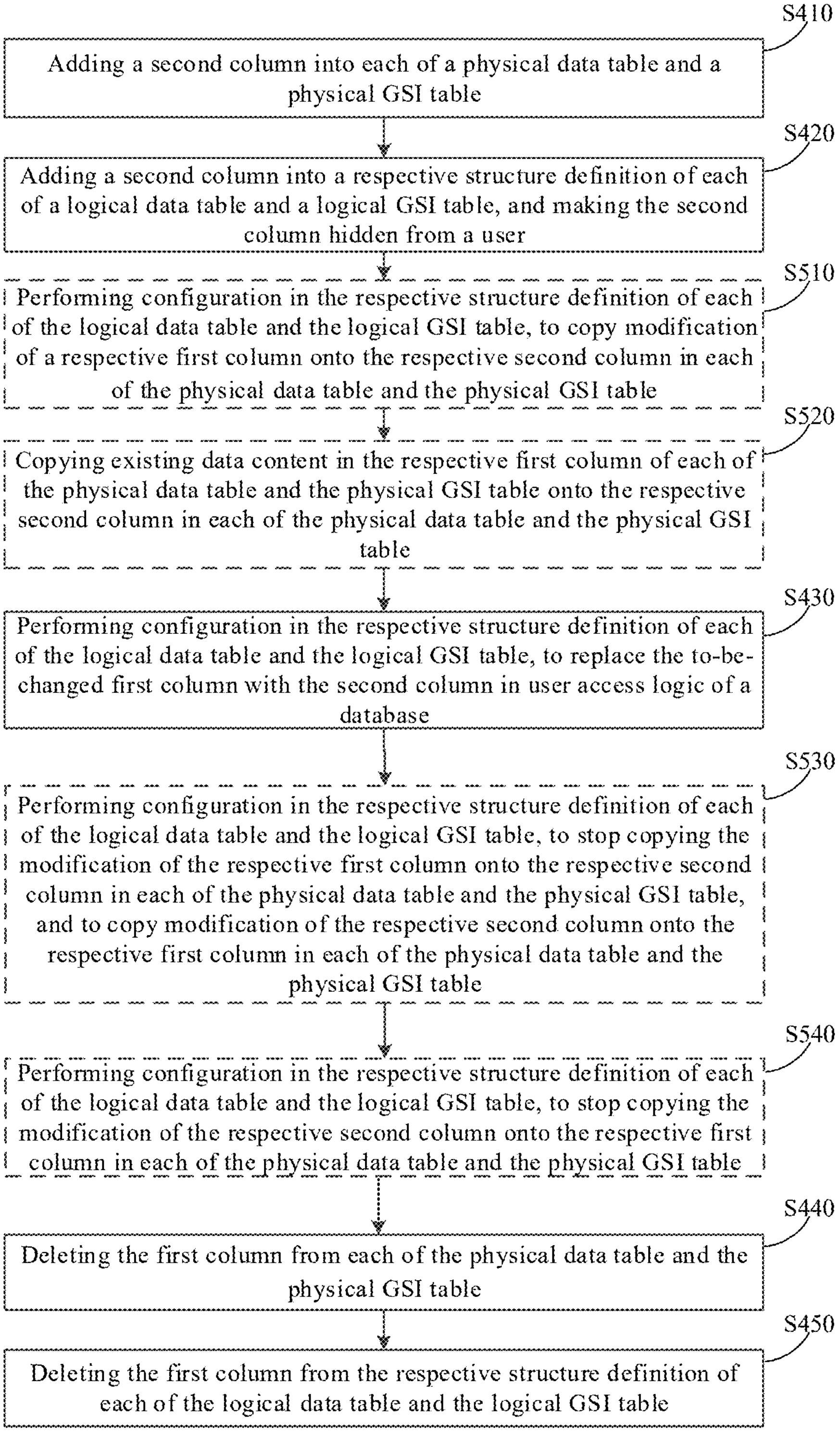
FIG. 5 is a schematic flowchart of a column changing method for a database according to an improved embodiment of the present disclosure.

FIG. 5 is a schematic flowchart of a column changing method for a database according to an improved embodiment of the present disclosure.

The method shown in FIG. 5 includes the steps S410 to S450 described above with reference to FIG. 4. These steps may be the same as described above with reference to FIG. 4.

The newly added steps S510 to S540 in FIG. 5 are respectively used to synchronize different data content or user-initiated data modifications between the first column and the second column at different timings, to cause the first column and the second column to have the same data content. It should be understood that in the improved embodiment of the column changing method for the database, only any one of the steps S510 to S540 may be included, or a combination of any two or three of them may be included, or all of them may be included.

As shown in FIG. 5, after the step S420, in a case that the first column is displayed to the user and the second column is hidden from the user, in the step S510, configuration may be performed in the respective structure definition of each of the logical data table and the logical GSI table, so that modification of the respective first column is copied onto the respective second column in each of the physical data table and the physical GSI table. Such a modification-copy operation may be referred to as a "column multi-write" operation.

More broadly, a column multi-write operation refers to that when a user writes a value into a certain column in a logical table through a logical DML, one copy is copied to another column in a physical table through a physical DML. This operation can be enabled through a configuration item of a structure definition of a logical table (logical Schema) on a computing node.

Thus, when the second column has been added but the replacement changing between the first column and the second column is not implemented yet, the second column may be caused to accept the same modification operation as the first column, so that the modified new data content is kept consistent between the two columns.

In other words, through the column multi-write operation, the data content of the second columns of the physical data table and the physical GSI table is consistent with the data content of the first columns of the physical data table and the physical GSI table.

In a case that the first column may already have data content, in the step S520, existing data content in the respective first column may further be copied onto the respective second column in each of the physical data table and the physical GSI table. Such a content-copy operation may be referred to as a "column backfill" operation.

More broadly, a column backfill operation refers to copying the values of a certain column into another column in a physical table. This operation is done in a data node.

In this way, the second column can be made to have the historical data content that the first column has already had previously.

On the other hand, after the step S430, in a case that the first column is hidden from the user and the second column is displayed to the user, in the step S530, configuration may be performed in the respective structure definition of each of the logical data table and the logical GSI table, to stop copying the modification of the respective first column onto the respective second column in each of the physical data table and the physical GSI table (that is, to stop the above column multi-write operation), and to copy modification of the respective second column onto the respective first column in each of the physical data table and the physical GSI table. The modification-copy operation here may also be referred to as a "column multi-write" operation, or may also be referred to as a "reverse column multi-write" operation. In other words, in the step S530, the direction of the column multi-write operation is modified.

In this way, the first column and the second column may continue to keep having the same data content before the first column is deleted, to avoid a potential user access failure.

For example, in a case that there are multiple computing nodes, if in the step S430, configuration is performed in the respective structure definition of each of the logical data table and the logical GSI table in a computing node, to replace the to-be-changed first column with the second column in user access logic of the database, and the modified structure definition has not been synchronized to all of the computing nodes yet, then in respective structure definitions of the logical data tables and the logical GSI tables on some of the computing nodes, the user still accesses the first columns. In this way, it is necessary to continue keeping the first column and the second column having the same data content, so that the new data content modified to the second column by the user can also be synchronized to the first column.

It should be understood that in the above description about the step S430, in a case that the to-be-changed attribute is a column type while a column name does not need to be changed, after performing successive exchanging of the column names of the first columns and the second columns in the physical tables and the logical tables, the direction of the column multi-write has already been automatically adjusted accordingly. This is also because in the database, the operation is performed on the column based on the column name, as described above. After the column name exchanging, the corresponding direction of the column multi-write operation is modified to get reversed.

In a case that the respective structure definition of each of the logical data table and the logical GSI table configured, such as in the step S430, has been synchronized to all of the computing nodes, in the step S540, configuration may be performed in the respective structure definition of each of the logical data table and the logical GSI table, to stop copying the modification of the respective second column onto the respective first column in each of the physical data table and the physical GSI table, that is, to stop the reverse column multi-write operation.

Thereafter, the steps S440 and S450 may be performed to delete the first columns in the physical table and the logical table, without worrying about the loss of data content.

Hereinafter, with reference to FIGS. 6A to 6H and FIGS. 7A to 7I, the solutions of performing column changing in two cases in the embodiments of the present disclosure will be further described in detail.

It is assumed that there is a table T. In a database, corresponding to the table T, there are a logical data table, a physical data table, a logical GSI table, and a physical GSI table. Specifically, the GSI table provides a global secondary index for the data table, and the data table and the GSI table each have a logical table and a physical table.

Since the same operation is to be performed on the data table and the GSI table, in FIGS. 6A to 6H and FIGS. 7A to 7I, for the table T, only one table is shown as an illustration for each of the logical table and the physical table.

A column changing operation is to be performed on a column in the table T, where the column name of the column to be changed is "A", and the column type is "L1".

According to the to-be-modified attribute of the column, it can be divided into two cases:

(1) modifying the type of column A from L1 to L2, and modifying the column name to "B";

(2) modifying the type of column A from L1 to L2 without modifying the column name.

The column changing process in the case (1) is described below with reference to FIGS. 6A to 6H.

FIGS. 6A to 6H schematically show the column changing process in the case (1).

Figure 6A:
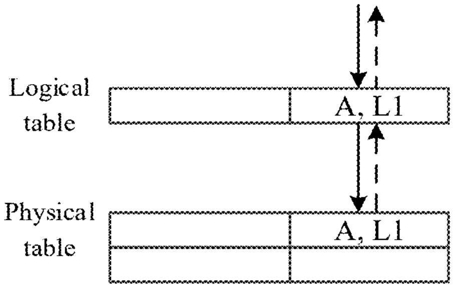
FIGS. 6A to 6H schematically show a column changing process in a case.

FIG. 6A schematically shows an initial state. In the figures, solid arrows indicate a write operation, and dashed arrows indicate a read operation. For column A and column B involved here, the column pointed to by the user's read/write arrows indicates that the column is visible to the user, and the column not pointed to indicates that it is not visible to the user.

As shown in FIG. 6A, both the logical table and the physical table have a column (the first column) with the column name "A" and the column type "L1". The column A is visible to the user, that is, the user can perform a write/read operation on the column A. In FIG. 6A, a write/read operation on the column A is indicated by solid arrows pointing to the column A or dashed arrows leading from the column A, which indicate that the column A is visible to the user.

As described above, when performing access control, or when sending a physical SQL instruction from the logical layer of the computing node to the physical layer of the data node, a column to be accessed can be determined through a column name, although distinguishing can be made, for example, by the unique invariant column ID each has. Hereinafter, a column is represented using a column name.

In the column changing operation described below, from the user's perspective, the column name of the column A is changed to "B", and the column type is changed to "L2". The column name "B" and the column type "L2" are attribute change target values for the column A.

Figure 6B:
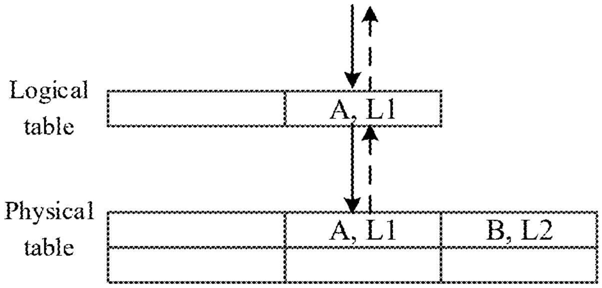

As shown in FIG. 6B, a column (the second column) is added into each of the physical data table and the physical GSI table, where the column name is "B", and the column type is "L2".

Here, the case that the association between the column of the logical table and the column of the physical table is achieved through the same column name between the logical table and the physical table is taken as an example for description. It should be understood that any other column names, such as "C", may also be set for the second column added in the physical table, and later after the second column is added in the logical table, the column B added in the logical table may just be set to be mapped to the column C in the physical table. In this case, "column B" in the physical table mentioned below may be replaced with "column C".

At this time, in the structure definition (logical Schema) of each of the logical data table and the logical GSI table, the column B (the second column) does not exist in the table T1 yet, so the column B is not visible to the user.

Figure 6C:
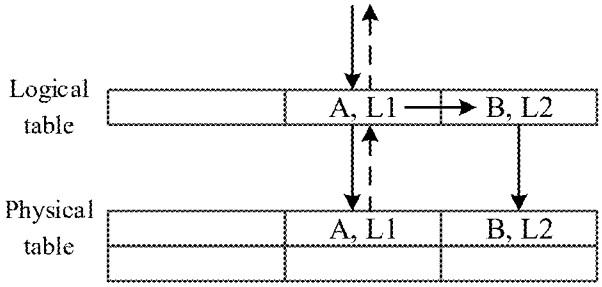

Next, as shown in FIG. 6C, the structure definition of each of the logical data table and the logical GSI table is modified, and the column B is added but hidden from the user, so the column B is still not visible to the user.

At the same time, a column multi-write operation may be enabled for the data table and the GSI table, that is, all of user's modifications to the column A are copied onto the column B, which is indicated by the horizontal arrow pointing from the column A to the column B in the logical table in FIG. 6C.

In addition, the changed structure definition of each of the logical data table and the logical GSI table may be synchronized to all of the computing nodes. As described above, such synchronization operation may be an atomic operation.

Figure 6D:
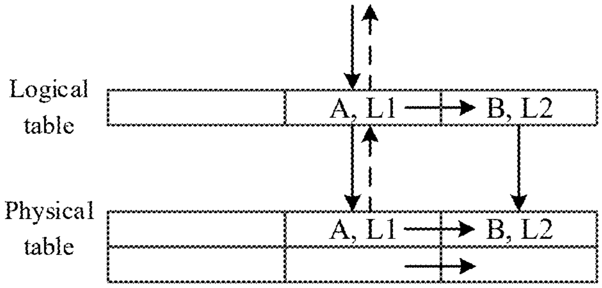

As shown in FIG. 6D, a column backfill operation may be performed on each of the physical data table and the physical GSI table, that is, all content in the column A of the physical table is copied onto the column B, which is indicated by the horizontal arrow pointing from the column A to the column B in the physical table in FIG. 6D.

Figure 6E:
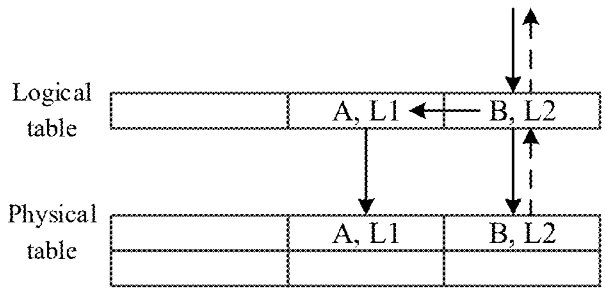

After the column backfill operation shown in FIG. 6D is completed, as shown in FIG. 6E, the column A is hidden and the column B is displayed in the structure definition of each of the logical data table and the logical GSI table, thus the modified result seen by the user is the column B. In other words, the user can access (read/write) the column B and can no longer access the column A.

At the same time, the direction of the column multi-write may be modified, that is, all of user's modifications to the column B are copied onto the column A, which is indicated by the horizontal arrow pointing from the column B to the column A in the logical table in FIG. 6E.

In addition, the changed structure definition of each of the logical data table and the logical GSI table may be synchronized to all of the computing nodes. As described above, such synchronization operation may be an atomic operation.

Figure 6F:
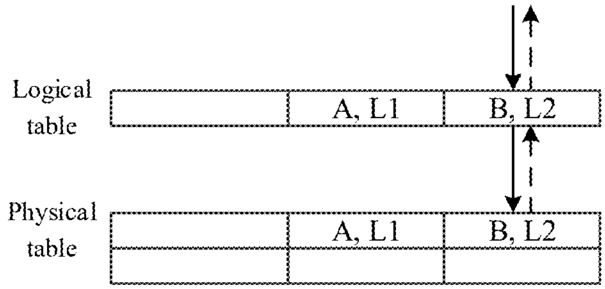

Then, as shown in FIG. 6F, the structure definition of each of the logical data table and the logical GSI table may be modified to stop the column multi-write.

In addition, the changed structure definition of each of the logical data table and the logical GSI table may be synchronized to all of the computing nodes.

Figure 6G:
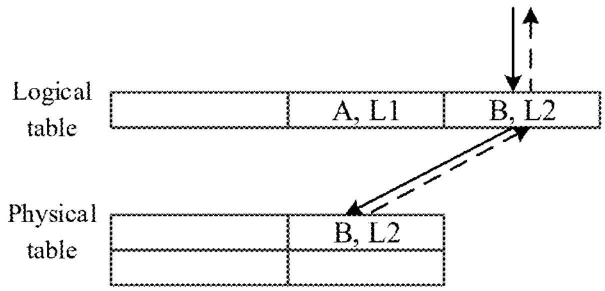

Thus, as shown in FIG. 6G, the column A may be deleted from each of the physical data table and the physical GSI table.

Figure 6H:
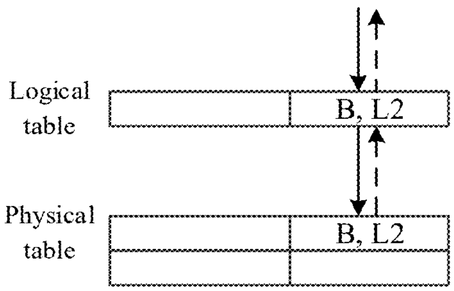

Further, as shown in FIG. 6H, the structure definition of each of the logical data table and the logical GSI table may be modified to delete the column A.

In addition, the changed structure definition of each of the logical data table and the logical GSI table may be synchronized to all of the computing nodes.

Thus, by adding the column B, switching the column access logic, and deleting the column A, the column A is replaced with the column B. From the user's perspective, the original column with the column type "L1" and the column name "A" is changed to the column with the column type "L2" and the column name "B".

Next, the column changing process in the above-described case (2) is described with reference to FIGS. 7A to 7I.

FIGS. 7A to 7I schematically show the column changing process in the above case (2).

Figure 7A:
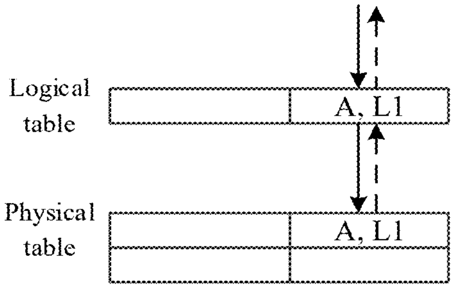
FIGS. 7A to 7I schematically show a column changing process in another case.

FIG. 7A schematically shows an initial state. As shown in FIG. 7A, both the logical table and the physical table have a column (the first column) with a column name "A" and a column type "L1", where the column A is visible to the user.

Column name exchanging of two columns is involved in the following description. From a user's perspective and/or a perspective of a database control logic, column names are still used to indicate respective columns, but it should be understood that before and after the column name exchanging, the column indicated by the same column name has changed actually. This can be understood by referring to remarks of "the first column" and "the second column" (equivalent to invariant unique column identifiers such as a column ID) in parentheses.

In the column changing operation described below, from the user's perspective, the column type of the column A is changed to "L2", while the column name remains unchanged, which is still "A". The column type "L2" is an attribute change target value of the column A.

Figure 7B:
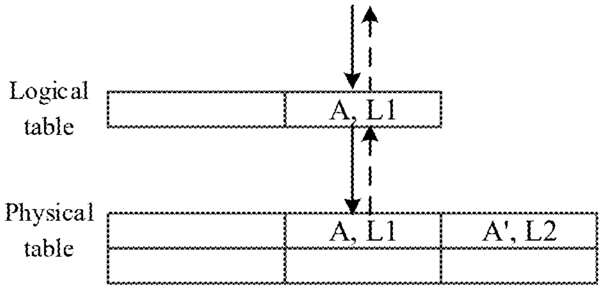

As shown in FIG. 7B, a column (the second column) is added into each of the physical data table and the physical GSI table, where the column name is "A", and the column type is "L2".

At this time, in the structure definition (logical Schema) of each of the logical data table and the logical GSI table, the column A' (the second column) does not exist in the table T1 yet, so the column A' is not visible to the user.

Figure 7C:
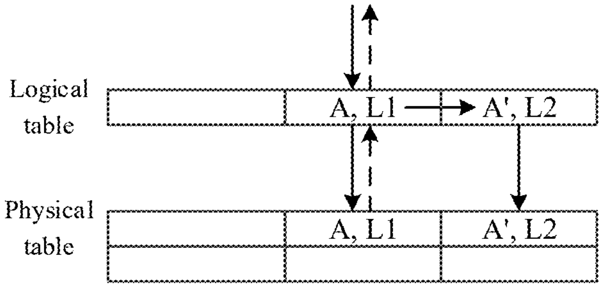

Next, as shown in FIG. 7C, the structure definition of each of the logical data table and the logical GSI table is modified, and the column A' is added but hidden from the user, so the column A' is still not visible to the user.

Here, the case that the association between the column of the logical table and the column of the physical table is achieved through the same column name between the logical table and the physical table is taken as an example for description. It should be understood that a column name of a column added in the logical table may be different from a column name of a column added in the physical table. For example, the column name of the column added in the physical table may be set to "D", and the column A' in the logical table may just be mapped to the column D in the physical table. In this case, "column A" in the physical table mentioned below may be replaced with "column D".

At the same time, a column multi-write operation is enabled, where all of user's modifications to the column A are copied onto the column A', which is indicated by the horizontal arrow pointing from the column A to the column A' in the logical table in FIG. 7C.

In addition, the changed structure definition of each of the logical data table and the logical GSI table may be synchronized to all of the computing nodes. As described above, such synchronization operation may be an atomic operation.

Figure 7D:
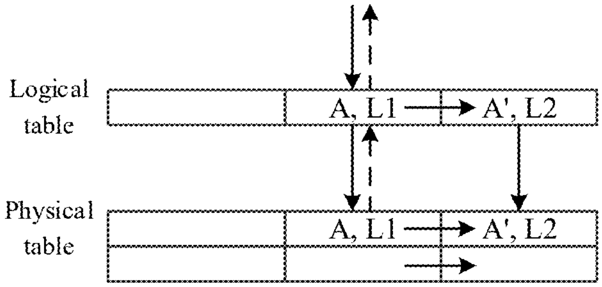

As shown in FIG. 7D, a column backfill operation may be performed on each of the physical data table and the physical GSI table, that is, all content in the column A of each of the physical data table and the physical GSI table is copied onto the column A', which is indicated by the horizontal arrow pointing from the column A to the column A' in the physical table in FIG. 7D.

Figure 7E:
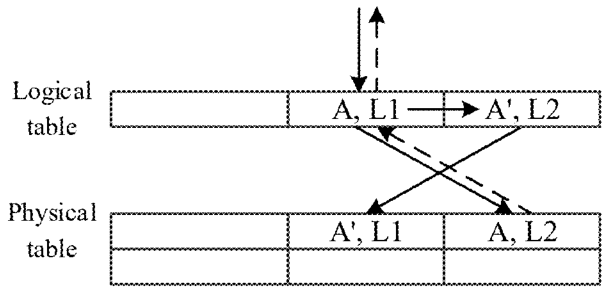

After the column backfill operation shown in FIG. 7D is completed, as shown in FIG. 7E, the column names of the column A and the column A' (the first column and the second column) are exchanged in the physical data table and the physical GSI table.

After the exchanging is completed, in each of the physical data table and the physical GSI table, the column type of the column A (the second column) is "L2", and the column type of the column A' (the first column) is "L1".

Here, the case that the association between the column of the logical table and the column of the physical table is achieved through the same column name between the logical table and the physical table is taken as an example for description, and the column names of the first column and the second column in the physical table are exchanged. As described above, the mapping relationships of the first column and the second column in the physical table with the first column and the second column in the logical table may also be exchanged to implement the exchanging of the association relationship.

Figure 7F:
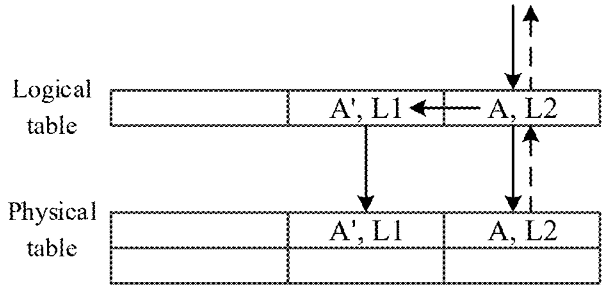

Next, as shown in FIG. 7F, the column names of the column A and the column A' (the first column and the second column) are exchanged in the structure definition of each of the logical data table and the logical GSI table.

After the exchanging is completed, seen from the column names, the column A' (which has actually been the first column by replacement) is still hidden. The modified result seen by the user is that the type of the column A (which has actually been the second column by replacement) is "L2".

At this time, the column reverse write operation from the column A (the first column) to the column A' (the second column) in FIG. 7E has been naturally converted to the column reverse write operation from the column A (the second column) to the column A' (the first column) after the column name exchanging in FIG. 7F.

In addition, the changed structure definition of each of the logical data table and the logical GSI table may be synchronized to all of the computing nodes.

Figure 7G:
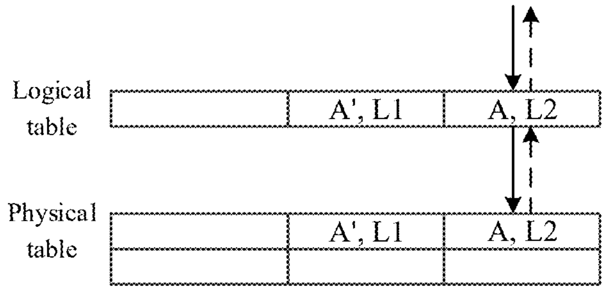

Then, as shown in FIG. 7G, the structure definition of each of the logical data table and the logical GSI table may be modified to stop the column multi-write.

In addition, the changed structure definition of each of the logical data table and the logical GSI table is synchronized to all of the computing nodes.

Figure 7H:
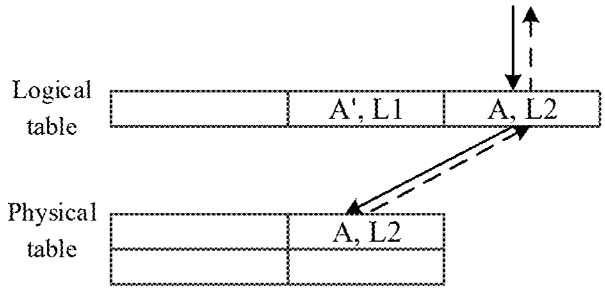

Thus, as shown in FIG. 7H, the column A' (the first column) may be deleted from each of the physical data table and the physical GSI table.

Figure 7I:
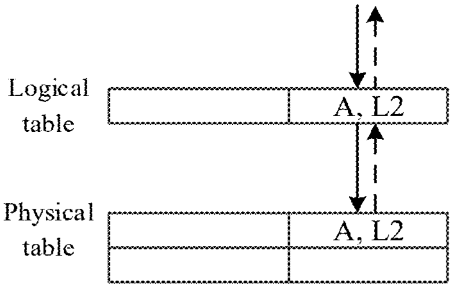

Further, as shown in FIG. 7I, the structure definition of each of the logical data table and the logical GSI table may be modified to delete the column A' (the first column).

In addition, the changed structure definition of each of the logical data table and the logical GSI table may be synchronized to all of the computing nodes.

Thus, by adding the column A', switching the column names, and deleting the column A, the original column is replaced with the newly added column. From the user's perspective, the original column with the column type "L1" and the column name "A" is changed to the column with the column type "L2" and still the column name "A".

In the column changing solutions of the present disclosure, by converting the performing of the physical column changing operation into a manner of adding physical columns, renaming physical columns and deleting physical columns, when the column changing is performed in the distributed database, the changing of the structure definition of the logical table (logical Schema) is caused to be not affected by the different completion time of the changing of the structure definition of the physical table (physical Schema), which can ensure that a specific time point can be selected for the changing of the logical Schema, so that the user can see a time point of unified changing, and the changing takes effect on the primary table (data table) and the GSI at the same time.

Moreover, in MySQL, adding columns, renaming columns, and deleting columns are all online DDL operations. In the column changing solutions of the present disclosure, column type changing operations belonging to online DDL operations natively supported by MySQL can be used, so all physical DDL instructions involved in the solutions will not block the execution of the DML concurrently executed by the user, avoiding the problem that the original column changing operation needs to block the user DML, and there is no need to additionally use the Binlog or trigger.

When performing the column changing through the column changing solutions of the present disclosure, the user can access data through the old column until the logical Schema is switched. After the logical Schema is switched, the data can be accessed directly through the new column. Therefore, the situation that access to both the new column and the old column may go wrong when part of physical DDL instructions are completed, will not happen.

In addition, since the switching of the logic of the primary table (data table) and the GSI table is an atomic operation, the user's viewing for the logical Schemas of the primary table (data table) and the GSI table must be consistent.

In addition, in the case that there are multiple computing nodes, for all logical Schema operations, the column changing solutions of the present application allow different computing nodes to possess different logical Schemas used before and after the update at the same time, without affecting the correctness of read/write access, until the synchronization of all of the computing nodes is completed. The logical Schema operations (configuration of the structure definition of the logical table) involved in the column changing solutions of the present disclosure are respectively analyzed and described below.

(1) Regarding the operations of adding the new column in the logical Schema (the step S420) and enabling the column multi-write (the step S510).

The newly added column does not exist in the old version of the logical Schema, thus this column cannot be read from, and the column cannot be written into.

Although this column has been added in the new version of the logical Schema, this column is hidden from the user. When writing into the old column, the computing node will automatically copy the user's write onto the new column (the column multi-write). What the user reads from is still the old column. Therefore, the possible lack of data in the new column at this time will not affect the user's read. Therefore, normal access can be achieved through both different versions of the logical Schemas used before and after the changing.

(2) Regarding the operations of hiding the old column and displaying the new column in the logical Schema when changing the column name and the column type or changing the column name, or the operation of exchanging the column names in the logical Schema when changing the column type (the step S430).

At this time, after the column backfill operation (the step S520), the data content of the old and new columns is consistent. The old column is still accessed in the old version of the logical Schema, but the data content written via the new version of the logical Schema will be automatically copied onto the old column (the step S530). Therefore, the situation that the data content written via the new version of the logical Schema cannot be read will not occur.

Similarly, the data content written via the old version of the logical Schema will be automatically copied onto the new column, so the data content written via the old version of the logical Schema can also be read in the new version of the logical Schema.

Therefore, normal access can be achieved through both different versions of the logical Schemas used before and after the changing.

(3) Regarding the operation of stopping the column multi-write in the logical Schema (the step S540).

At this time, the reading is performed via the new columns in both the old and new versions of the logical Schemas, so stopping the column multi-write will not affect the data read by the user.

(4) Regarding the operation of deleting the old column in the logical Schema (the step S450).

At this time, this column will be no longer accessed in both the old and new versions of the logical Schemas, so normal access can be achieved through both different versions of the logical Schemas.

Figure 8:
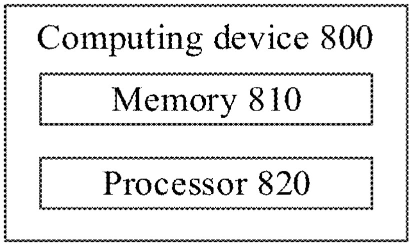
FIG. 8 shows a schematic structural diagram of a computing device that can be used to implement the above column changing method for the database according to an embodiment of the present disclosure.

FIG. 8 shows a schematic structural diagram of a computing device that can be used to implement the above column changing method for a database according to an embodiment of the present disclosure.

Referring to FIG. 8, the computing device 800 includes a memory 810 and a processor 820.

The processor 820 may be a multi-core processor, or may include multiple processors. In some embodiments, the processor 820 may include a general-purpose main processor and one or more special co-processors, such as a graphics processing unit (GPU), a digital signal processor (DSP), etc. In some embodiments, the processor 820 may be implemented by using a customized circuit, such as an application specific integrated circuit (ASIC, Application Specific Integrated Circuit) or a field programmable gate array (FPGA, Field Programmable Gate Array).

The memory 810 may include various types of storage units, such as a system memory, a read-only memory (ROM), and a permanent storage apparatus. Here, the ROM may store static data or instructions needed by the processor 820 or other modules of a computer. The permanent storage apparatus may be a read-write storage apparatus. The permanent storage apparatus may be a non-volatile storage device that will not lose stored instructions and data even after a computer is powered off. In some embodiments, for the permanent storage apparatus, a high-capacity storage apparatus (e.g., a magnetic or optical disk, a flash memory) is employed as the permanent storage apparatus. In other embodiments, the permanent storage apparatus may be a removable storage device (e.g., a floppy disk, an optical drive). The system memory may be a read-write storage device or a volatile read-write storage device, such as a dynamic random access memory. The system memory may store instructions and data needed by some or all running processors. In addition, the memory 810 may include a combination of any computer-readable storage media, including various types of semiconductor memory chips (DRAM, SRAM, SDRAM, flash memory, programmable read-only memory), where magnetic disks and/or optical disks may also be used. In some embodiments, the memory 810 may include a removable storage device that is readable and/or writable, such as a compact disc (CD), a read-only digital versatile disc (e.g., DVD-ROM, dual-layer DVD-ROM), a read-only Blu-ray disc, an ultra-density disc, a flash memory card (e.g., an SD card, a mini SD card, a Micro-SD card, etc.), a magnetic floppy disk, etc. The computer-readable storage media do not include carrier waves and transient electronic signals transmitted wirelessly or via a wire.

The memory 810 stores executable code, and when the executable code is processed by the processor 820, the processor 820 may be caused to perform the above-mentioned column changing method for the database.

The column changing method for the database according to the present disclosure has been described in detail above with reference to the drawings.

Furthermore, the methods according to the present disclosure may also be implemented as a computer program or a computer program product, where the computer program or the computer program product includes computer program code instructions for performing the above-described steps defined in the above-described method of the present disclosure.

Or, the present disclosure may also be implemented as a non-transitory machine-readable storage medium (or a computer-readable storage medium, or a machine-readable storage medium), on which executable code (or a computer program, or computer instruction code) is stored, and when the executable code (or the computer program, or the computer instruction code) is executed by a processor of an electronic device (or a computing device, a server, etc.), the processor is caused to perform the steps of the above method according to the present disclosure.

Those skilled in the art will also understand that the various exemplary logical blocks, modules, circuits, and algorithm steps described in connection with the disclosure herein may be implemented as electronic hardware, computer software, or a combination of both.

The flowcharts and block diagrams in the drawings show the architectures, functionalities, and operations of possible implementations of systems and methods according to various embodiments of the present disclosure. In this regard, each block in the flowcharts or block diagrams may represent a module, segment, or portion of code, where the module, segment, or portion of code includes one or more executable instructions for implementing specified logical functions. It should also be noted that in some alternative implementations, the functions labeled in blocks may also occur in an order different from the order labeled in the drawing. For example, two consecutive blocks may actually be performed substantially in parallel, or sometimes may also be performed in a reverse order, which depends on the involved functionality. It is also noted that each block in the block diagrams and/or flowcharts, and a combination of blocks in the block diagrams and/or flowcharts, can be implemented by using a dedicated hardware-based system that performs a specified function or operation, or can be implemented by using a combination of dedicated hardware and computer instructions.

Various embodiments of the present disclosure have been described in the above. The foregoing description is exemplary, not exhaustive, and is not limited to the disclosed embodiments. Many modifications and variations will be apparent to those of ordinary skill in the art without departing from the scope and spirit of the illustrated embodiments. The terminologies used herein are chosen to best explain the principles of the various embodiments, the practical applications of the various embodiments, or improvements to techniques in the market by the various embodiments, or to make others of ordinary skill in the art understand the various embodiments disclosed herein.

The invention claimed is:

1. A column changing method for a database, wherein the database has a data table and a global secondary index (GSI) for the data table, the data table having a logical data table on a computing node and a physical data table on a data node, and the GSI having a logical GSI table on the computing node and a physical GSI table on the data node; and the method comprises:

adding a second column into each of the physical data table and the physical GSI table, wherein a value of at least one attribute of the second column in each of the physical data table and the physical GSI table is a change target value of a corresponding to-be-changed attribute of a first column in the data table;

adding a second column into a respective structure definition of each of the logical data table and the logical GSI table, and making the second column hidden from a user, wherein the second column in the logical data table and the second column in the logical GSI table are respectively associated with the second column in the physical data table and the second column in the physical GSI table, and a value of the at least one attribute of the second column in each of the logical data table and the logical GSI table is the change target value;

performing configuration in the respective structure definition of each of the logical data table and the logical GSI table, to replace a first column with the second column in user access logic of the database;

deleting the first column from each of the physical data table and the physical GSI table; and deleting the first column from the respective structure definition of each of the logical data table and the logical GSI table.

2. The method according to claim 1, wherein, both a column name of the second column in each of the physical data table and the physical GSI table and a column name of the second column in each of the logical data table and the logical GSI table are a change target value of a column name of the first column; or a column name of the second column in the logical data table and a column name of the second column in the logical GSI table are configured to be mapped to a column name of the second column in the physical data table and a column name of the second column in the physical GSI table.

3. The method according to claim 1, further comprising:

each time after performing changing on the respective structure definition of each of the logical data table and the logical GSI table, synchronizing a changed structure definition of each of the logical data table and the logical GSI table to all computing nodes.

4. The method according to claim 3, wherein, the operation of synchronizing the changed structure definition of each of the logical data table and the logical GSI table to all computing nodes is an atomic operation.

5. The method according to claim 3, wherein, after performing the configuration in the respective structure definition of each of the logical data table and the logical GSI table, to replace the first column with the second column in the user access logic of the database, and synchronizing the changed structure definition of each of the logical data table and the logical GSI table to all computing nodes, the step of deleting the first column from each of the physical data table and the physical GSI table is performed.

6. The method according to claim 1, further comprising:

after adding the second column and before deleting the first column, making the second column of the physical data table and the second column of the physical GSI table have same data content as the first column of the physical data table and the first column of the physical GSI table.

7. The method according to claim 6, wherein the step of making the second column of the physical data table and the second column of the physical GSI table have the same data content as the first column of the physical data table and the first column of the physical GSI table comprises at least one of the following:

in a case that the first column is displayed to the user and the second column is hidden from the user, performing configuration in the respective structure definition of each of the logical data table and the logical GSI table, to copy modification of the respective first column onto the respective second column in each of the physical data table and the physical GSI table;

copying existing data content in the respective first column onto the respective second column in each of the physical data table and the physical GSI table; or in a case that the first column is hidden from the user and the second column is displayed to the user, performing configuration in the respective structure definition of each of the logical data table and the logical GSI table, to stop copying the modification of the respective first column onto the respective second column in each of the physical data table and the physical GSI table, and to copy modification of the respective second column onto the respective first column in each of the physical data table and the physical GSI table.

8. The method according to claim 7, wherein before the step of deleting the first column from each of the physical data table and the physical GSI table, the method further comprises:

performing configuration in the respective structure definition of each of the logical data table and the logical GSI table, to stop copying the modification of the respective second column onto the respective first column in each of the physical data table and the physical GSI table.

9. The method according to claim 1, wherein, the to-be-changed attribute of the first column comprises a column name and a column type, or only comprises a column name; and the step of performing the configuration in the respective structure definition of each of the logical data table and the logical GSI table, to replace the first column with the second column in the user access logic of the database, comprises:

performing the configuration in the respective structure definition of each of the logical data table and the logical GSI table, so that the first column is hidden from the user and the second column is displayed to the user;

and/or, the to-be-changed attribute of the first column comprises a column type, and the step of performing the configuration in the respective structure definition of each of the logical data table and the logical GSI table, to replace the first column with the second column in the user access logic of the database, comprises:

exchanging a column name of the first column and a column name of the second column in each of the physical data table and the physical GSI table, or modifying column names of first columns and column names of second columns in the logical data table and the logical GSI table to be mapped respectively to column names of second columns and column names of first columns in the physical data table and the physical GSI table; and exchanging the column names of the first columns and the column names of the second columns in the respective structure definitions of the logical data table and the logical GSI table.

10. The method according to claim 9, wherein, the database is a distributed database; and/or for the database, an operation is performed on a column based on a column name.

11. A database system, comprising one or more computing nodes and one or more data nodes, wherein the database system comprises a database, and the database has a data table and a global secondary index (GSI) for the data table, the data table having a logical data table on a computing node of the one or more computing nodes and a physical data table on a data node of the one or more data nodes, and the GSI having a logical GSI table on the computing node and a physical GSI table on the data node; wherein a column changing operation is performed by using the following operations:

adding a second column into each of the physical data table and the physical GSI table, wherein a value of at least one attribute of the second column in each of the physical data table and the physical GSI table is a change target value of a corresponding to-be-changed attribute of a first column in the data table;

adding a second column into a respective structure definition of each of the logical data table and the logical GSI table, and making the second column hidden from a user, wherein the second column in the logical data table and the second column in the logical GSI table are respectively associated with the second column in the physical data table and the second column in the physical GSI table, and a value of the at least one attribute of the second column in each of the logical data table and the logical GSI table is the change target value;

performing configuration in the respective structure definition of each of the logical data table and the logical GSI table, to replace a first column with the second column in user access logic of the database;

deleting the first column from each of the physical data table and the physical GSI table; and deleting the first column from the respective structure definition of each of the logical data table and the logical GSI table.

12. A computing device, comprising:

a processor; and a memory storing executable code, wherein when the executable code is executed by the processor, the processor is caused to perform operations for a database, wherein the database has a data table and a global secondary index (GSI) for the data table, the data table having a logical data table on a computing node and a physical data table on a data node, and the GSI having a logical GSI table on the computing node and a physical GSI table on the data node, wherein the operations comprise:

adding a second column into each of the physical data table and the physical GSI table, wherein a value of at least one attribute of the second column in each of the physical data table and the physical GSI table is a change target value of a corresponding to-be-changed attribute of a first column in the data table;

adding a second column into a respective structure definition of each of the logical data table and the logical GSI table, and making the second column hidden from a user, wherein the second column in the logical data table and the second column in the logical GSI table are respectively associated with the second column in the physical data table and the second column in the physical GSI table, and a value of the at least one attribute of the second column in each of the logical data table and the logical GSI table is the change target value;

performing configuration in the respective structure definition of each of the logical data table and the logical GSI table, to replace a first column with the second column in user access logic of the database;

deleting the first column from each of the physical data table and the physical GSI table; and deleting the first column from the respective structure definition of each of the logical data table and the logical GSI table.

13. A non-transitory machine-readable storage medium, having executable code stored thereon, wherein when the executable code is executed by a processor of an electronic device, the processor is caused to perform the method according to claim 1.

14. The database system according to claim 11, wherein, both a column name of the second column in each of the physical data table and the physical GSI table and a column name of the second column in each of the logical data table and the logical GSI table are a change target value of a column name of the first column; or a column name of the second column in the logical data table and a column name of the second column in the logical GSI table are configured to be mapped to a column name of the second column in the physical data table and a column name of the second column in the physical GSI table.

15. The database system according to claim 11, wherein the operations further comprise:

each time after performing changing on the respective structure definition of each of the logical data table and the logical GSI table, synchronizing a changed structure definition of each of the logical data table and the logical GSI table to all computing nodes.

16. The database system according to claim 15, wherein, the operation of synchronizing the changed structure definition of each of the logical data table and the logical GSI table to all computing nodes is an atomic operation.

17. The database system according to claim 15, wherein, after performing the configuration in the respective structure definition of each of the logical data table and the logical GSI table, to replace the first column with the second column in the user access logic of the database, and synchronizing the changed structure definition of each of the logical data table and the logical GSI table to all computing nodes, the step of deleting the first column from each of the physical data table and the physical GSI table is performed.

18. The computing device according to claim 12, wherein, both a column name of the second column in each of the physical data table and the physical GSI table and a column name of the second column in each of the logical data table and the logical GSI table are a change target value of a column name of the first column; or a column name of the second column in the logical data table and a column name of the second column in the logical GSI table are configured to be mapped to a column name of the second column in the physical data table and a column name of the second column in the physical GSI table.

19. The computing device according to claim 12, wherein the operations further comprise:

each time after performing changing on the respective structure definition of each of the logical data table and the logical GSI table, synchronizing a changed structure definition of each of the logical data table and the logical GSI table to all computing nodes.

20. The computing device according to claim 19, wherein, the operation of synchronizing the changed structure definition of each of the logical data table and the logical GSI table to all computing nodes is an atomic operation.

* * * * *